United States Patent [19]
Johannessen et al.

[11] Patent Number: 5,850,200
[45] Date of Patent: Dec. 15, 1998

[54] MAGNETIC CROSSED-LOOP ANTENNA

[76] Inventors: Paul R. Johannessen, 40 Tyler St., Lexington, Mass. 02173; Andre V. Grebnev, 25 Summer St., Bedford, Mass. 01730

[21] Appl. No.: 733,296

[22] Filed: Oct. 17, 1996

[51] Int. Cl.⁶ ........................................ H01Q 21/00
[52] U.S. Cl. ........................................ 343/867; 343/855
[58] Field of Search ........................ 343/867, 866, 343/741, 742, 850, 852, 853, 855; H01Q 21/00

[56] References Cited

U.S. PATENT DOCUMENTS

| | | | |
|---|---|---|---|
| 2,108,878 | 2/1938 | Wright | 343/867 |
| 2,280,562 | 4/1942 | Weagant | 343/855 |
| 2,291,450 | 7/1942 | Case | 343/855 |
| 2,690,509 | 9/1954 | Toth | 343/855 |

*Primary Examiner*—Hoanganh Le
*Attorney, Agent, or Firm*—Rines and Rines

[57] ABSTRACT

A novel magnetic crossed loop antenna system is provided for use with radio navigation signals, such as provided by two or more Loran-C transmitters, and in which each loop antenna is rapidly switched between the receiving channel and that of the other loop-antenna to enable the selection of one channel with the strongest signals from both transmitters, and through tuning the antenna to the Loran-C frequency and providing rate compensation and feedback to the antenna, optimum signal-to-noise ratio, sufficiently wide bandwidth to ensure time delay stability and attenuated amplifier noise are achieved, enabling greatly improved location and tracking.

9 Claims, 6 Drawing Sheets

MAGNETIC CROSSED-LOOP ANTENNA

The present invention relates to loop antennas, being more particularly directed to magnetic core loop antennas and to pairs of crossed-loop antennas useful in position location determination from the reception thereby of navigation radio signal transmissions, such as in Loran-C navigation or vehicle location applications and the like.

BACKGROUND

Loop antennas, including arrays involving orthogonally and otherwise relatively positioned or crossed loops have been used for many years in myriads of radio location and homing systems.

For purposes such as the above-mentioned reception of radio navigation signals and the like, specifically Loran-C type transmissions, however, resort has been had to the use of linear antennas, such as whip antennas and the like, wherein, unlike loop antennas, all the received signals travel a single path into the receiver front end, with time difference measurements of signal arrival from two or more navigation transmitters unaffected by variations in receiver delays.

When using whip and similar antennas in applications such as vehicle tracking, signal losses caused by buildings in cities and other similar obstructions as well as E-field interference effects, as from power lines, and P-static effects deletereously plague the receiving system. Whip antennas, furthermore, for such useages, require considerable length and also the provision of a ground plane, neither of which is desirable for vehicle mounting and unobtrusiveness.

Heretofore, while loop antennas obviate these particular requirements and, in addition, do not suffer E-field or P-static interference effects, they have not lent themselves to Loran-C and similar location signal tracking applications in view of their lack of omni-directivity, the need for a pair of separate loops and associated band-pass filters and low noise amplifiers, and the inherently low signal strengths that may be involved.

An effective method of solving the omni-directivity problem is described in copending application Ser. No. 08/695, 361, filed Aug. 9, 1996, for "Method of and Apparatus For Position Location And Tracking Of A Vehicle Or The Like By The Reception At The Vehicle Of Pulsed Radio Navigation Signals As Of The Loran-C Type And The Like, With An Autonomous Loop Antenna Receiver".

The present invention addresses solving the problems arising from the use of two separate loops with associated circuitry and the low signal strength, enabling greatly improved reliability of reception of Loran-C and similar radio navigation transmissions and without the necessity for long antennas or ground planes.

OBJECTS OF INVENTION

An object of the invention, accordingly, is to provide a new and improved magnetic loop antenna for the reception and tracking, with the aid of radio navigation signals, particularly though not exclusively, as of the pulsed Loran-C radio navigation signals, that is superior to whip and similar antenna systems heretofore so used.

A further object is to provide a novel crossed-loop antenna of more general utility, as well.

Other and further objects will be described hereinafter and are more particularly delineated in the appended claims.

SUMMARY

In summary, the invention embraces a magnetic crossed-loop antenna apparatus having, in combination with a pair of orthoganally crossed loop antennas, a corresponding pair of receive channels for processing the radio signals received by the respective antennas from radio transmitting stations; means for rapidly switching each loop antenna back and forth between its channel and the channel of the other loop antenna and for selecting the antenna channel with the stronger signals therein; and means for providing optimum signal-to-noise ratio and sufficiently wide bandwidth in the receiving of the stronger signals in the selected antenna channel to ensure reception time delay stability.

Preferred and best mode embodiments and designs are hereinafter presented in detail.

DRAWINGS

The invention will now be described in connection with the accompanying drawings, FIG. 1 of which illustrates the crossed loop relative to three Loran-C transmitter stations;

DESCRIPTION OF PREFERRED EMBODIMENT(s) OF INVENTION

It is now in order to describe the preferred construction, operation and resulting improved performance of the magnetic crossed loop antennas of the invention, shown applied to the exemplary case of Loran-C signal reception and tracking.

The Loran-C system is based upon the measurement of time differences of signal arrival from two or more transmitters, as discussed, for example, in said application and the references cited therein, incorporated herein by reference. In a whip antenna receiving system, as before explained, all the received signals go through the same whip and the same front end of the receiver. Consequently, all received signals are delayed by the same amount so that the measured time differences are unaffected by variations in receiver delay.

Figure 1:
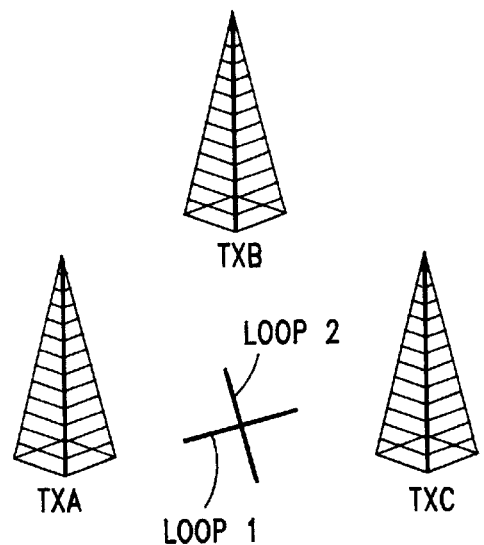
Figure 2:
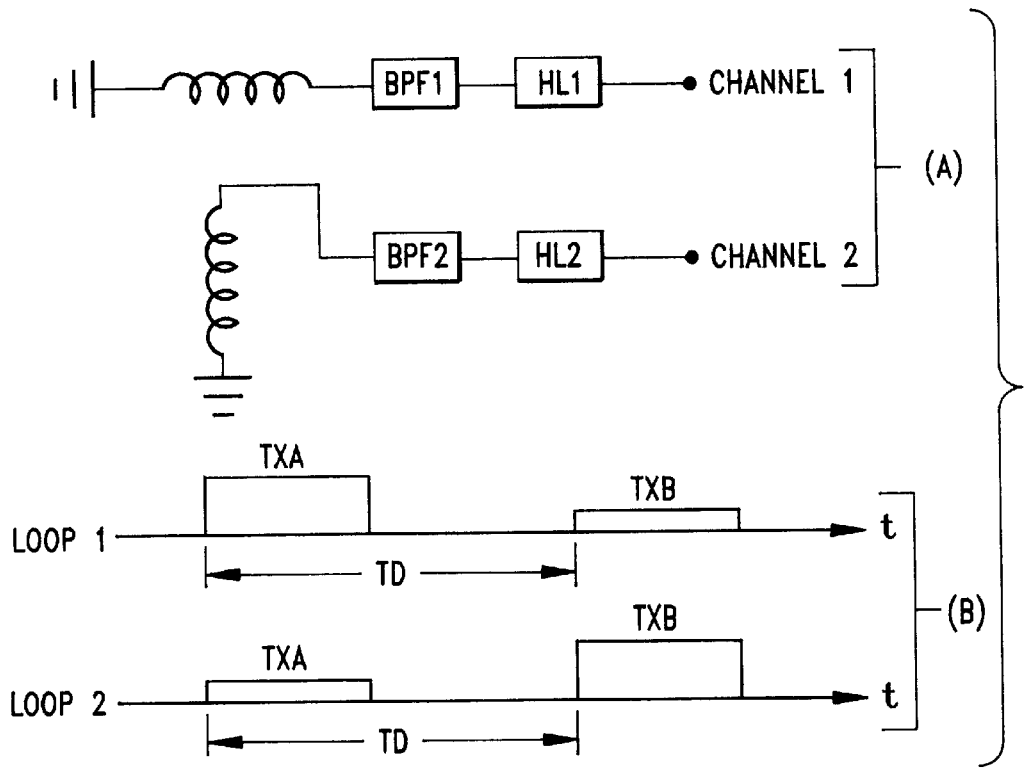
FIGS. 2A and 2B are a combined block and schematic drawing of crossed loop antennas and receiving channels (2A), together with signal waveforms therefore (2B)

In the crossed loop antenna receiver system, on the other hand, one loop antenna "Loop 1" may receive a strong signal from transmitter A and the other "Loop 2" may receive a strong signal from transmitter B. This situation is illustrated in FIG. 2.

Both Loop 1 and Loop 2 receive the signals from transmitters A and B, TxA and TxB, and pass the same along respective bandpass filters BF1 and BF2 and preferably hard limiters HL1 and HL2 to respective receiving channels 1 and 2 as described in said copending patent application, FIG. 2(A). Loop 1 is directed toward A and almost perpendicular to B, resulting in high signal strength from A and low signal strength from B, as show in the Loop 1 received signal waveforms of FIG. 2(B). Loop 2 is directed toward B and is almost perpendicular to A, thus giving low signal strength from A and high signal strength from B as shown in the lower waveform of FIG. 2(B).

To obtain a good measure of the time difference (TD) of the signals received from the two transmitters, using either one of the loop channels, is difficult because of the low signal strength of TxB in Channel 1 and TxA in Channel 2. However, by using TxA in Channel 1 and TxB in Channel 2, a good measure of the TD is obtained, provided the time delays in the two channels are equal. Because of the sharp attenuation of the band-pass filters, the delay through the channels can, indeed, be as high as 20 $\mu$sec. A variation between channels of 0.001% results in a timing error of 20 $\eta$sec, equivalent to a position error of 20 feet. It is very difficult to construct band-pass filters with 20 $\eta$sec delay variation over a wide temperature range.

Figure 3:
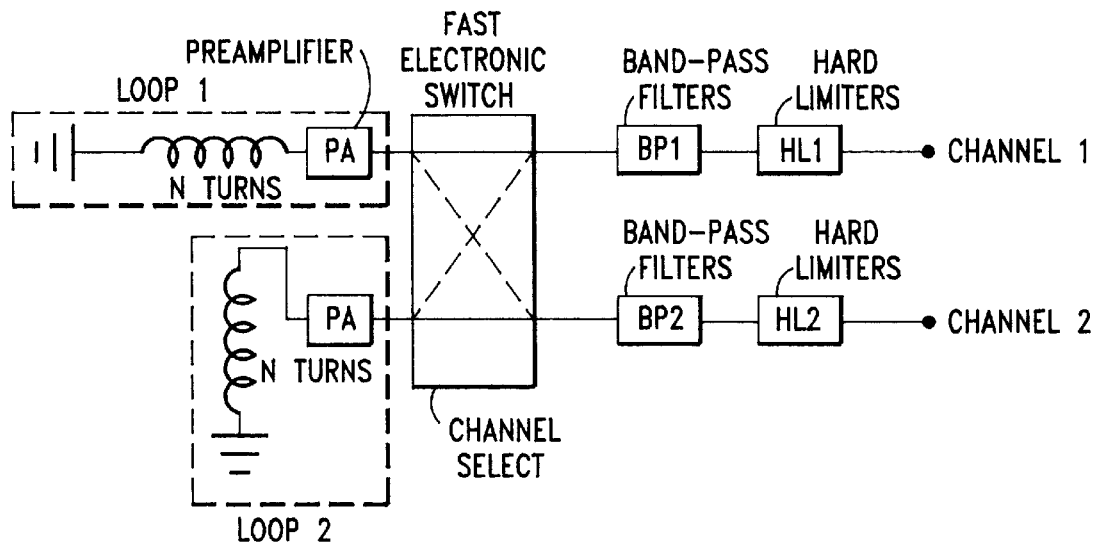
FIG. 3 is a circuit similar to FIG. 1 but in more detail, including an electronic channel-select switch.

To solve this problem in accordance with the invention, a fast electronic switching scheme is used as shown in FIG. 3.

Figure 4:
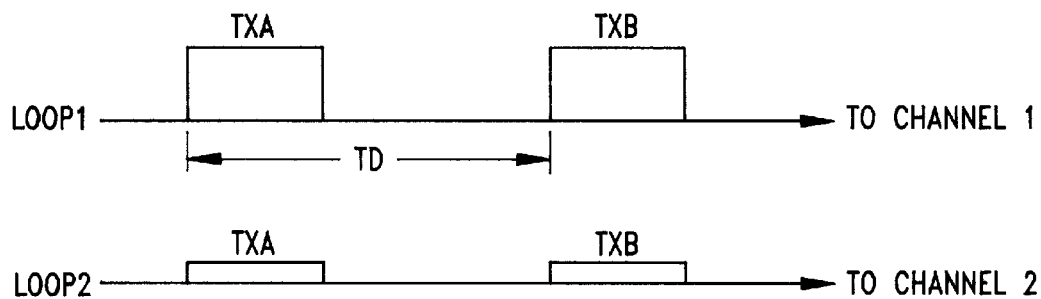
FIG. 4 is a waveform illustrative of received signals in the channels after switching.
Figure 9:
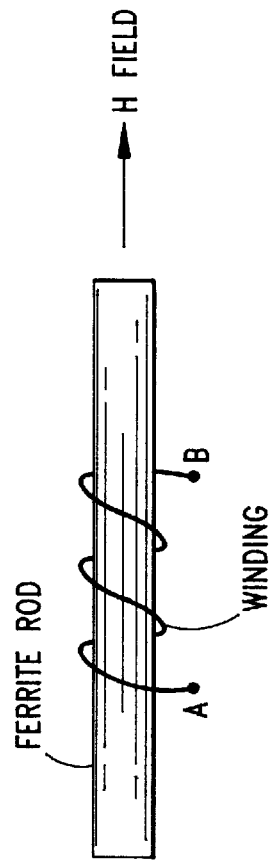
FIG. 9 is a diagram of a preferred ferrite loop antenna construction preferred for use with the invention.

Each of the orthogonally crossed loop antennas Loop 1 and Loop 2, preferably, for example, of the type shown in FIG. 9, embodying the loop winding about a ferrite rod core, wherein the H-field is oriented along the cylindrical rod axis, is alternately rapidly switched between its bandpass filter and hard limiter channel and that of the other loop channel. Thus, the switch is capable of switching the Loop 2 TxB signal into Channel 1, and the Loop 1 TxB signal into Channel 2, producing the resultant channel signals show in FIG. 4. The TD can now readily be measured selecting and using the strong signals in the same channel--in this case, Channel 1.

Figure 5:
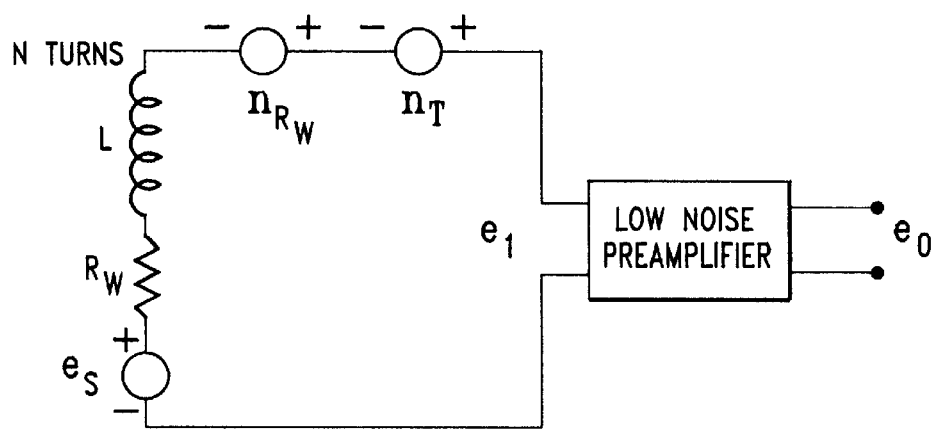
FIG. 5 is an equivalent circuit diagram of the loop antenna, and FIG. 6, for a tuned antenna.

It then remains to make the delays in Loop 1 and Loop 2 the same, and to obtain the highest possible signal-to-noise ratio (s/n). With each loop consisting of a winding on a ferrite core and each having a Low noise preamplifier, the equivalent circuit is as shown in FIG. 5. Two noise sources are shown: the thermal noise source caused by the winding resistances $n_R$, and the transistor amplifier noise source $n_T$. The signal source $e_s$, is the induced signal in the loop coil due to the Loran-C magnetic field. The signal-to-noise ratio (s/n) is given by:

$$s/n = \frac{e_s}{\sqrt{n_{R_W}^2 + n_T^2}} = \frac{1}{\sqrt{\left(\frac{n_{R_W}}{e_s}\right)^2 + \left(\frac{n_T}{e_s}\right)^2}} \quad (1)$$

where $$n_{R_W} - \sqrt{R_W} = \sqrt{\frac{wL}{Q}} - \sqrt{\frac{N^2}{Q}} = \frac{N}{\sqrt{Q}} \quad (2)$$

and $$e_s = N \text{ (number of turns)} \quad (3)$$

Using these relations gives $$\left(\frac{n_{R_W}}{e_s}\right)^2 - \frac{1}{Q} \quad (4)$$

-continued and $$\left(\frac{n_T}{e_s}\right)^2 - \left(\frac{n_T}{N}\right)^2 \quad (5)$$

Figure 6:
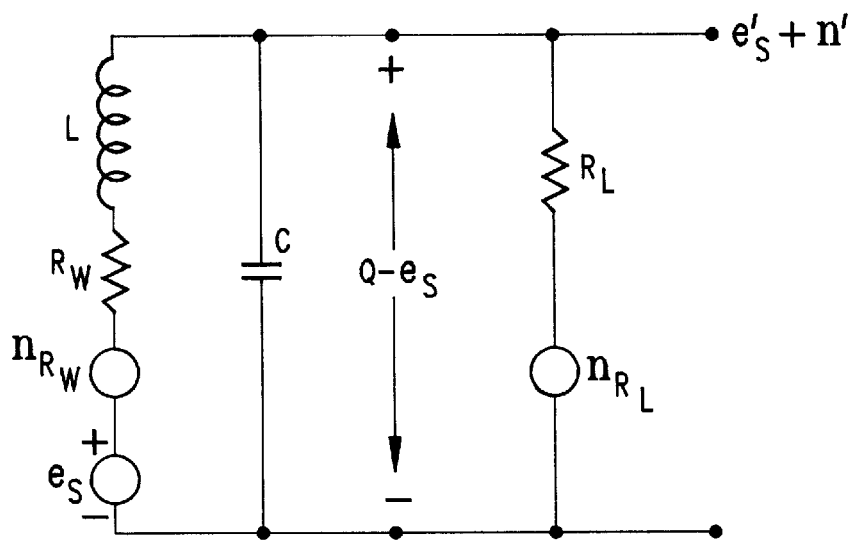

Therefore, to maximize s/n, the number of turns N and Q of the loop antenna should both be as large as possible. In practice, it has been found that a Q of over 100 is difficult to obtain because of the electrostatic shielding of the antenna. Tuning the antenna to the 100 kHz range of Loran-C signals, as by means of capacitor C, as shown in FIG. 6, however can increase the signal strength by a factor of Q. For a Q of 100, the bandwidth is only 1 kHz. In order to receive the Loran signals without distortion, the loop bandwidth must be at least 20 kHz. Thus, the antenna must be loaded down with a load resistor $R_L$ to reduce the Q to, say, a maximum acceptable value of 5. The Q of the circuit with $R_L$ connected across the loop antenna is called the loaded Q and is designated $Q_L$. The resistor $R_L$ generates additional thermal noise, as indicated by the source $n_R$ in the equivalent circuit diagram of FIG. 6. The output signals e', and n' are given by;

$$e'_s = Q_L e_s \quad (6)$$

$$n' = \sqrt{Q - Q_L} \; n_{R_W} \quad (7)$$

so that s/n becomes $$sin = \frac{e'_s}{n'} = \sqrt{\frac{Q_L}{Q}} \; \frac{e_s}{n_{R_W}} \quad (8)$$

For $Q_L$=5 and Q=100, a degradation in s/n of 4.47 is obtained.

Another problem then resides in the phase stability of a loop antenna with such a bandwidth of 20 kHz. A one percent variation in parameter values results in 70 $\mu$sec time delay variation, which is greater by a factor of 10 from an acceptable value.

Figure 7:
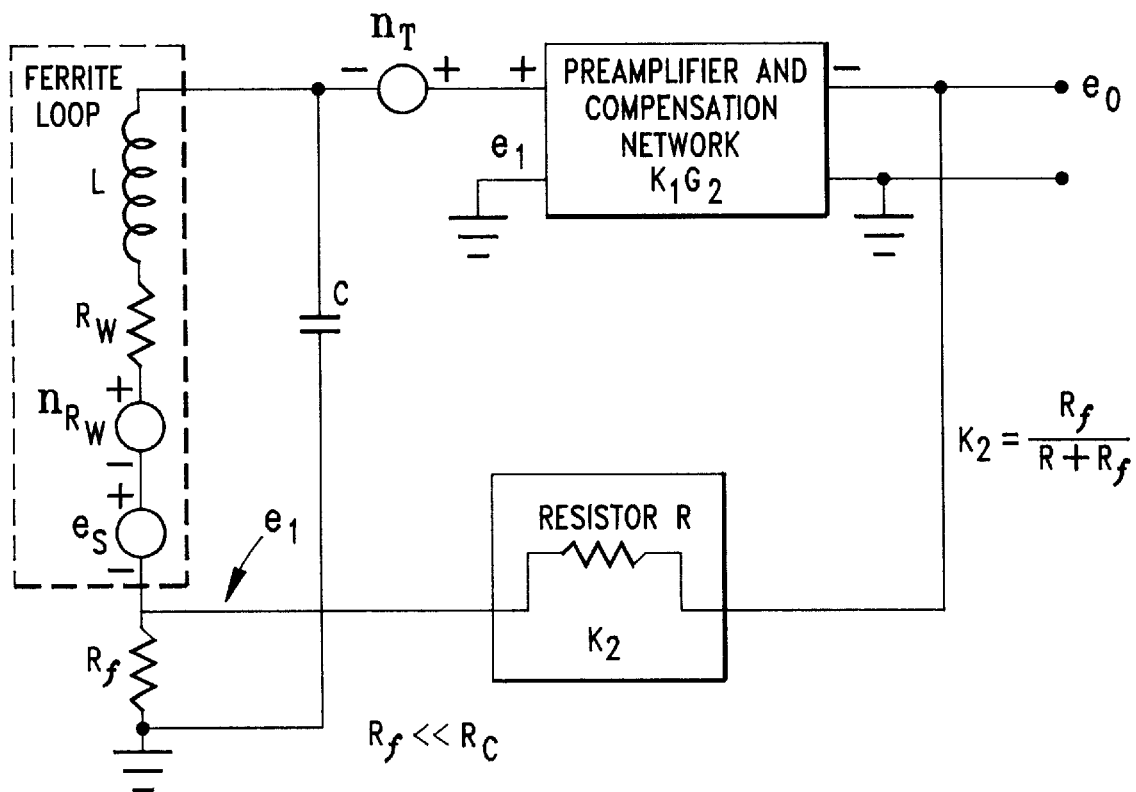
FIG. 7 is a circuit diagram of a preferred loop antenna employing a simple compensation network and feedback in accordance with the principals of the invention, with FIG. 8 detailing the preamplification and compensation for explanatory purposes, absent the feedback.

In accordance with the invention, all of these difficulties are admirably overcome without any additional circuit complexities by the novel use of a simple compensation network and appropriate feedback. This feedback system is shown in FIG. 7 wherein the input of the equivalent circuit of the tuned antenna of FIG. 6 is shown connected into a circuit having a preamplifier and compensation network $K_1 G_2$ from the output of which a feedback path through resistor $K_2$ to the ferrite loop is provided.

From this figure the following transfer functions are obtained $$\frac{Ei}{E_s + n_{R_W}} = \frac{\frac{1}{LC}}{s^2 + \frac{R_W}{L} s + \frac{1}{LC}} = G_1 \quad (9)$$

$$\frac{E_o}{E_s + n_{R_W}} = \frac{K_1 G_1 G_2}{1 + K_1 K_2 G_1 G_2} = G_{cl} \quad (10)$$

$$\frac{E_o}{n_T} = \frac{K_1 G_2}{1 + K_1 K_2 G_1 G_2} = \frac{G_{cl}}{G_1} \quad (11)$$

The compensation network transfer function is $$G_2 = \frac{s}{s + \omega_1} \quad (12)$$

Substituting Equations (9) and (12) in (10) gives $$G_{cl} = \frac{K_1 \frac{1}{LC} s}{s^3 + \left(\frac{R_W}{L} + \omega_1\right) s^2 + \left[\frac{R_W}{L}\omega_1 + (K_1 K_2 + 1)\frac{1}{LC}\right] s + \frac{\omega_1}{LC}} \quad (13)$$

Figure 8:
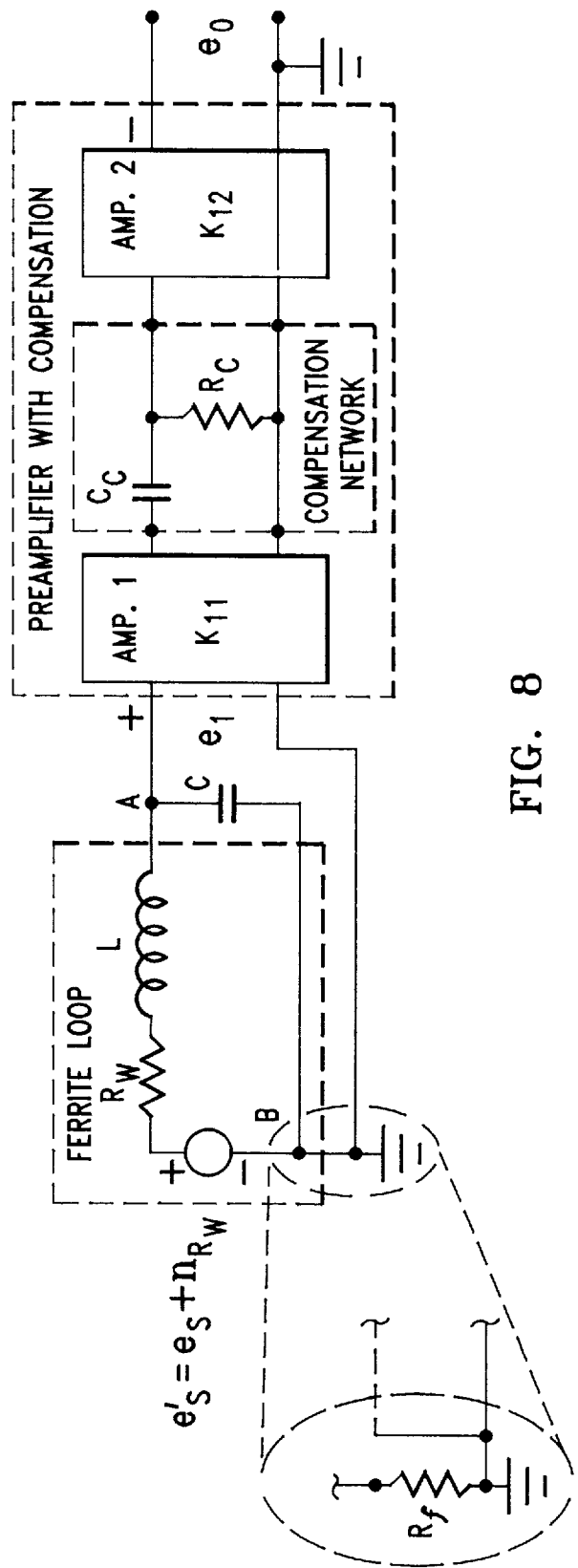

Having thus analyzed the functions involved, in order to understand the operation of the tuned loop antenna system of FIG. 7, it is believed to be helpful first to consider the circuit with the feedback path removed, and to divide the preamplifier/compensation circuit into two paths, as shown in FIG. 8. The ferrite loop antenna generates a signal $e_s$ across the loop terminals (A and B in FIG. 9) in response to the magnetic (H) field of the Loran C transmission.

The resistance of the winder $R_w$, generates thermal noise, $n_s$, which also appears across terminals A and B. The equivalent circuit of the ferrite loop antenna is shown in the first dotted box of FIG. 8. It consists of a series interconnection of a voltage source, $e_s + n_R$, the winding resistance, $R_w$, and the winding inductance L. As before stated, the loop antenna is tuned to the Loran-C carrier frequency (100 kHz) by means of capacitor C connected across terminals A and B. These terminals are in turn connected to the input of the preamplifier which consists of a cascade interconnection of Amplifier 1, the compensation network, and Amplifier 2. The compensation network is shown as a simple RC lead network.

The transfer function relating output signal, $E_O$, to the loop antenna signal $E_s$ is determined by the use of Laplace transformer as follows:

$$\frac{E_o(s)}{E_s(s)} = \frac{E_i(s)}{E_s(s)} \frac{E_o(s)}{E_i(s)} = G_1(s)G_2(s) \quad (14)$$

where:

$$G_1 = \frac{\frac{1}{LC}}{s^2 + \frac{R_W}{L}S + \frac{1}{LC}}$$

and $$G_2 = \frac{K_{11}K_{12}S}{S + \frac{1}{R_cC_c}} = \frac{K_1 S}{S + W_1}.$$

Considering now the feedback path $K_2$ of FIG. 7, as closed loop feedback system is obtained by feeding part of the output signal back to the antenna signal. A small resistor $R_f$ is connected between terminal B and ground, as shown, and the output signal, $e_0$, is then connected to point B through resistor R. With reference to FIG. 7, the gain $K_2$ becomes:

$$K_2 = \frac{R_f}{R + R_f} \quad (15)$$

A small step-down signal transformer (now shown) could also be used to provide this feedback signal.

The performance of this feedback system is determined by using standard feedback analysis. H. W. Bode in his famous book *Network Analysis and Feedback Amplifier Design* published by D. Van Nostrand Company, New York, 1945, was the first to introduce assymptotic Log magnitude vs. Log frequency plots (often referred to as Bode plots) to determine the performance of a feedback system.

Figure 10:
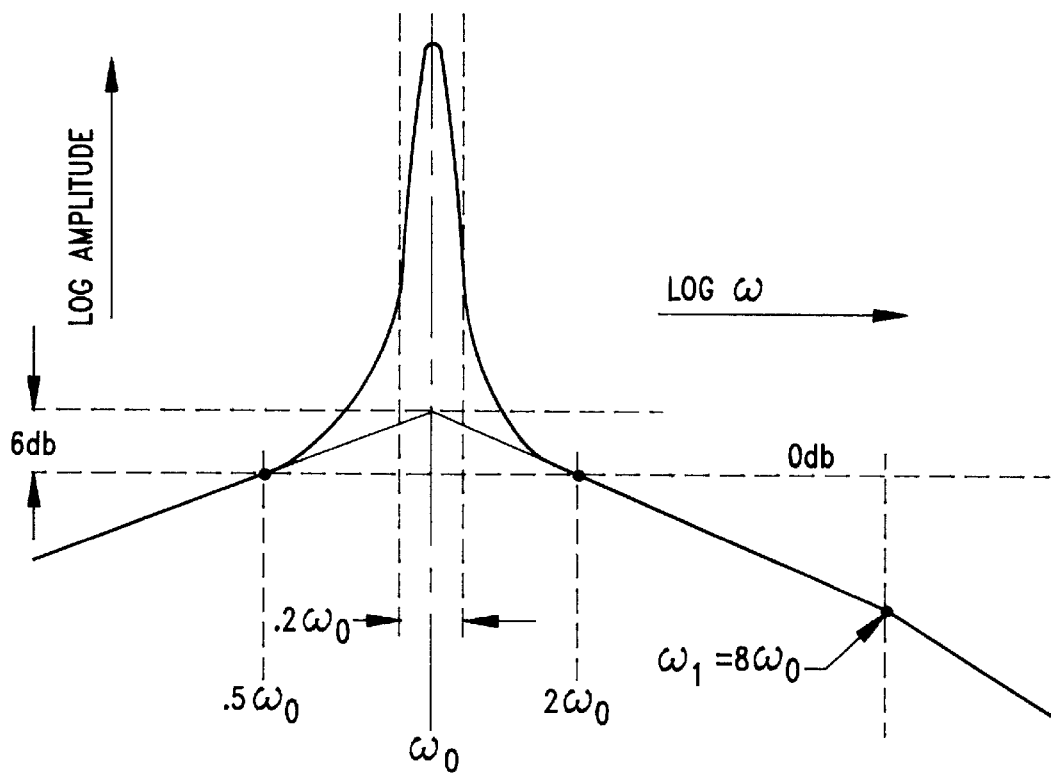
FIGS. 10 and 11 are Bode plot diagrams, later explained, showing the performance for open and closed loop transfer functions, respectively.
Figure 11:
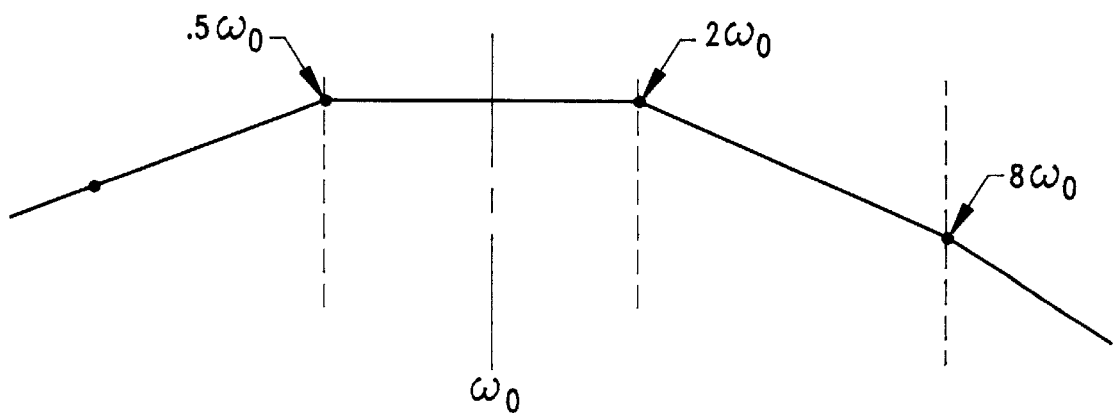

A Bode plot of the open-loop transfer function is shown in FIG. 10. If the O db loop gain is adjusted as shown in FIG. 10, then the closed-loop transfer function Bode plot becomes as shown n FIG. 11. Thus, by the use of feedback and a rate (or lead) compensation network, the high Q resonant circuit has been damped without adding a load resistor and, at the same time, a wide bandwidth loop has been obtained. A 1% variation in parameter variation now results in a time delay variation of less than 6ηsec—which is acceptable.

Figure 12:
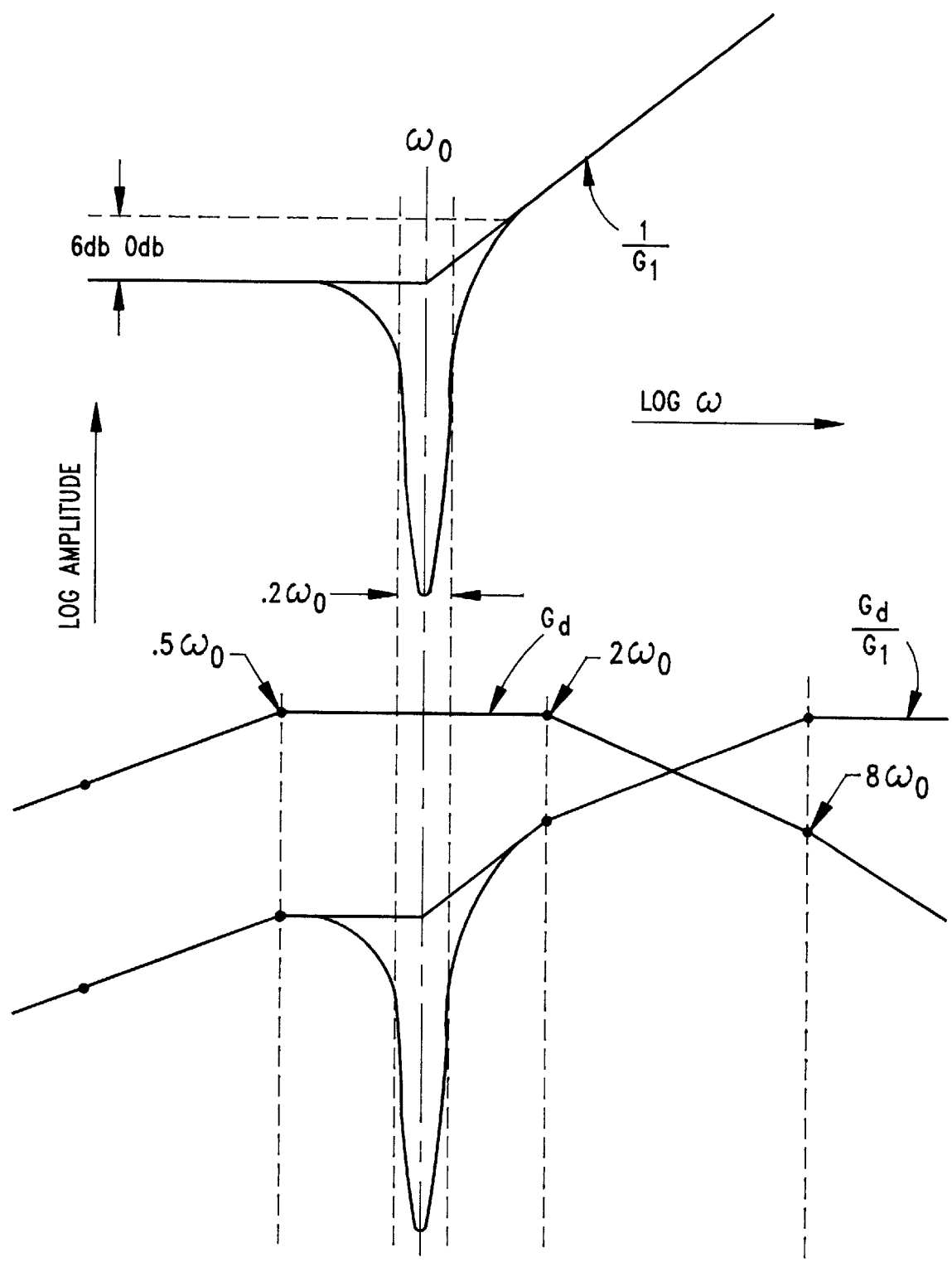
FIG. 12 presents similar Bode plots for the system response to transistor noise in the receiver circuits.

The response to transistor input noise $n_f$, is given by previously stated Equation (11). A Bode plot of this transfer function is shown in FIG. 12. As seen from this plot, the in-band transistor noise has been reduced by more than 15 db. Thus, the feedback system described not only provides the optimum signal-to-noise ratio and wide bandwidth to ensure time delay stability, but it also attenuates the transistor amplifier noise by more than 15 db.

Further modifications will occur to those skilled in this art and such are considered to fall within the spirit and scope of the invention as defined in the appended claims.

What is claimed is:

1. A magnetic crossed-loop antenna apparatus having, in combination with a pair of orthoganally crossed loop antennas, a corresponding pair of receive channels for processing the radio signals received by the respective antennas from radio transmitting stations; means for rapidly switching each loop antenna back and forth between its channel and the channel of the other loop antenna and for selecting the antenna channel with the stronger signals therein; and means for providing optimum signal-to-noise ratio and sufficiently wide bandwidth in the receiving of the stronger signals in the selected antenna channel to ensure reception time delay stability.

2. Apparatus as claimed in claim 1 and in which the transmitting stations are Loran-C transmitters wherein the time differences of signal arriving at the loop antennas from two or more transmitters is to be measured, and in which the switching means enables each channel to receive also the signals of the other channel so as to enable a good measure of said time delay, with the time delays in the channels being equal.

3. Apparatus as claimed in claim 2 and in which the means for providing optimum signal-to-noise ratio and wide enough bandwidth to ensure time delay stability comprises a rate compensation network connected to the loop antenna of said selected channel, and a feedback path therefrom back to said loop antenna.

4. Apparatus as claimed in claim 3 and in which the loop antenna of said selected channel is tuned to the Loran-C radio frequency to provide a relatively high Q resonant circuit.

5. Apparatus as claimed in claim 4 and in which the use of the feedback path and rate compensation network enables the high Q resonant circuit to be damped without the need for a local resistor, while achieving a wide bandwidth loop.

6. Apparatus as claimed in claim 5 and in which the selected loop antenna is connected to the compensation networks through a transistor preamplifier, with the feedback also reducing the effect of transmitter noise.

7. Apparatus as claimed in claim 6 and in which the rate compensation network is an RC lead network.

8. Apparatus as claimed in claim 4 and in which the tuning is effected by a capacitor connected across the loop antenna.

9. Apparatus as claimed in claim 2 and in which the loop antennas are windings about ferrite rods the axis of which are disposed parallel to the magnetic H field of the received signals.

* * * * *